(12) United States Patent
Han et al.

(10) Patent No.: US 10,746,113 B2
(45) Date of Patent: Aug. 18, 2020

(54) METHOD FOR COMPENSATING NOISE OF CRANK SENSOR

(71) Applicants: HYUNDAI MOTOR COMPANY, Seoul (KR); KIA Motors Corporation, Seoul (KR)

(72) Inventors: Jung-Suk Han, Hwaseong-si (KR); Hyeok-Jun Kwon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 16/124,039

(22) Filed: Sep. 6, 2018

(65) Prior Publication Data
US 2019/0136774 A1    May 9, 2019

(30) Foreign Application Priority Data
Nov. 3, 2017 (KR) ........................ 10-2017-0146207

(51) Int. Cl.
| | |
|---|---|
| *F02D 41/00* | (2006.01) |
| *F02D 45/00* | (2006.01) |
| *G01B 21/22* | (2006.01) |
| *G01D 3/032* | (2006.01) |
| *G01D 5/00* | (2006.01) |
| *F02D 41/28* | (2006.01) |

(52) U.S. Cl.
CPC ........... *F02D 41/009* (2013.01); *F02D 45/00* (2013.01); *G01B 21/22* (2013.01); *G01D 3/032* (2013.01); *G01D 5/00* (2013.01); *F02D 2041/281* (2013.01); *F02D 2200/101* (2013.01)

(58) Field of Classification Search
CPC .. F02D 41/009; F02D 45/00; F02D 2200/101; F02D 2041/281; G01D 3/32; G01D 5/00; G01B 21/22
See application file for complete search history.

(56) References Cited

U.S. PATENT DOCUMENTS

| | | | | |
|---|---|---|---|---|
| 4,471,653 A | * | 9/1984 | Kawamura | ........... F02D 41/009 123/612 |
| 4,494,518 A | * | 1/1985 | Katayama | ............. F02P 15/008 123/612 |
| 4,502,446 A | * | 3/1985 | Kanegae | ................ F02P 5/1502 123/479 |
| 4,966,116 A | * | 10/1990 | Sakurai | ................. F02P 3/0456 123/406.18 |

(Continued)

FOREIGN PATENT DOCUMENTS

| | | |
|---|---|---|
| KR | 10-2006-0034416 A | 4/2006 |
| KR | 10-2017-0052994 A | 5/2017 |

*Primary Examiner* — Phutthiwat Wongwian
*Assistant Examiner* — Sherman D Manley
(74) *Attorney, Agent, or Firm* — Morgan, Lewis & Bockius LLP

(57) ABSTRACT

Disclosed is to a method for compensating noise of a crank sensor in a vehicle. When noise is applied to a crank sensor, information of a crank is predicted based on information input up to now without canceling engine synchronization. The method for compensating noise of a crank sensor includes: judging an engine stroke based on an ignition angle and, based on amount of compensation determined accordingly, creating virtual information of a crank, when judgment of fault of crank signal occurs discontinuously.

7 Claims, 2 Drawing Sheets

(56) References Cited

U.S. PATENT DOCUMENTS

| | | | | |
|---|---|---|---|---|
| 5,647,322 | A | * | 7/1997 | Fukui .................... F02D 41/009 123/406.18 |
| 5,909,724 | A | * | 6/1999 | Nishimura .......... F02D 41/1498 123/436 |
| 6,546,911 | B1 | * | 4/2003 | Fayyad ................. F02D 41/009 123/406.13 |
| 6,644,273 | B1 | * | 11/2003 | Hagari .................. F02D 41/009 123/406.18 |
| 2007/0175272 | A1 | * | 8/2007 | Kondo .................. F02D 41/009 73/114.26 |
| 2008/0189024 | A1 | * | 8/2008 | Kondo .................. F02D 41/009 701/102 |
| 2013/0096812 | A1 | * | 4/2013 | Kawakami ............. G06F 19/00 701/114 |
| 2019/0136774 | A1 | * | 5/2019 | Han ....................... G01D 3/032 |

* cited by examiner

METHOD FOR COMPENSATING NOISE OF CRANK SENSOR

CROSS-REFERENCE(S) TO RELATED APPLICATIONS

This application claims priority to Korean Patent Application No. 10-2017-0146207, filed on Nov. 3, 2017, which is incorporated herein by reference in its entirety.

BACKGROUND

Field

Embodiments of the present invention relate to a method for compensating noise of a crank sensor, and more particularly to a method for compensating noise of a crank sensor wherein when noise is applied to a crank sensor, information of a crank is predicted based on information input up to now without canceling engine synchronization.

Description of Related Art

When noise is applied to a crank sensor, an engine control unit (ECU) first performs glitch filtering on a hardware basis.

If the applied noise of the crank sensor is smaller than width of a glitch filter, the noise signal is ignored by the glitch filter and therefore no signal is input to a software. However, when noise signal larger than the width of the glitch filter is applied, the software determines it as interrupt and recognizes it as a crank tooth.

The disclosure of this section is to provide background of the invention. Applicant notes that this section may contain information available before this application. However, by providing this section, Applicant does not admit that any information contained in this section constitutes prior art.

SUMMARY

In an approach, when signal from the crank sensor is interrupted, the software, i.e., engine position management (EPM) always compares the signal with the preceding crank signal and then determines whether the crank is in normal/faulty state. The reason for always determining normal/fault is because input timing and cycle of the crank have greatly influence on calculation of angles in an EPM driver. As such, when it is determined that signal of the crank is an abnormal signal which deviates from a normal range even just once, synchronization of engine position is canceled and thereafter the synchronization is resumed.

However, since fuel injection and ignition may not be performed for a certain time period, although the amount of the time from the time when engine synchronization is canceled to the time when the engine synchronization is resumed varies depending on revolution per minute (RPM), occurrence of engine stopping may be inevitable.

In an approach to solve such a problem, when an abnormal signal of a crank is input, it is not immediately determined as a failure, but signal input previously is used, ignoring signal input at the current time.

However, problem in that although failure judgment is not sensitive and thus cancellation of the engine synchronization can be avoided, error of angle may occur in the engine synchronization because the latest information of the crank is not used.

The present disclosure has been made in an effort to solve the above-described problem. An aspect of the present invention to provide a method for compensating noise of a crank sensor in order to make calculation of angles for engine synchronization as accurate as possible even when noise is input to a crank signal such that no significant difference between the calculated angle and an actual engine angle occurs.

Other objects and advantages of the present invention can be understood by the following description, and become apparent with reference to embodiments of the present invention. Also, it is obvious to those skilled in the art to which the present invention pertains that the objects and advantages of the present invention can be realized by the means as claimed and combinations thereof.

In accordance with one aspect of the present invention for accomplishing the object as mentioned above, a method for compensating noise of a crank sensor comprises: judging an engine stroke based on an ignition angle and, based on amount of compensation determined accordingly, creating virtual information of a crank, when judgment of fault of a crank signal occurs discontinuously.

Preferably, an angle before 90 degrees may be judged as an acceleration zone while an angle until 180 degrees after 90 degrees may be judged as a deceleration zone, and then amount of compensation in the acceleration zone and amount of compensation in the deceleration zone may be set differently.

Preferably, the amount of compensation may be set so as to vary depending on revolution per minute (RPM).

Preferably, the amount of compensation may be set such that it becomes smaller as the RPM becomes higher.

Preferably, the amount of compensation may be set by reflecting acceleration and deceleration characteristics depending on an engine.

The method for compensating noise of a crank sensor according to embodiments of the present invention has high robustness against noise signal of a crank, which can be input intermittently, so that fuel injection and ignition can be performed as accurate as possible.

It is to be understood that both the foregoing general description and the following detailed description of embodiments are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

A method for compensating noise of a crank sensor according to embodiments of the present invention will be described below in detail with reference to the accompanying drawings. However, detailed description of functions and constructions well known in the art may be omitted to avoid unnecessarily obscuring the gist of the present invention.

Disclosed is a method for operating a combustion engine in a vehicle. A crankshaft sensor (crank sensor) is provided to monitor rotation of a crankshaft in the combustion engine. At least one controller of the vehicle processes signals from the crankshaft sensor (crankshaft position sensor, crankshaft angle sensor) and controls operation of the combustion engine. In embodiments, using signals from the crankshaft sensor, the at least one controller controls at least one of (1) timing of fuel injection (direct spray injection) to an engine cylinder, (2) amount of fuel injection, (3) timing of ignition for the engine cylinder.

In embodiments, fuel injection and ignition inside the engine can be performed only when engine synchronization is secured (when crankshaft position/angle is synchronized properly among multiple components involved in the fuel injection and ignition). Since canceling of engine synchronization (identifying a failure crankshaft sensor) until re-gaining engine synchronization (resetting), the engine keeps rotating without fuel injection or ignition.

In embodiments, the at least one controller initiates a process for resetting (restoring) engine synchronization when a failure of the crankshaft sensor (crack tooth) is identified. In embodiments, at least one controller determines a failure of the crankshaft sensor when noise component (noise level) in signals from the crankshaft sensor is greater than a predetermined reference multiple times for a given time period (when noise level goes beyond a predetermined reference repeatedly for a reference time period). In response to a failure of the crankshaft sensor, the at least one controller conducts a reset of engine synchronization while fuel injection or ignition is not performed in the engine. As such, a reset of engine synchronization may be conducted only when at least two "crack tooth" occur (continuous, repeated error) within a reference time period.

Figure 1:
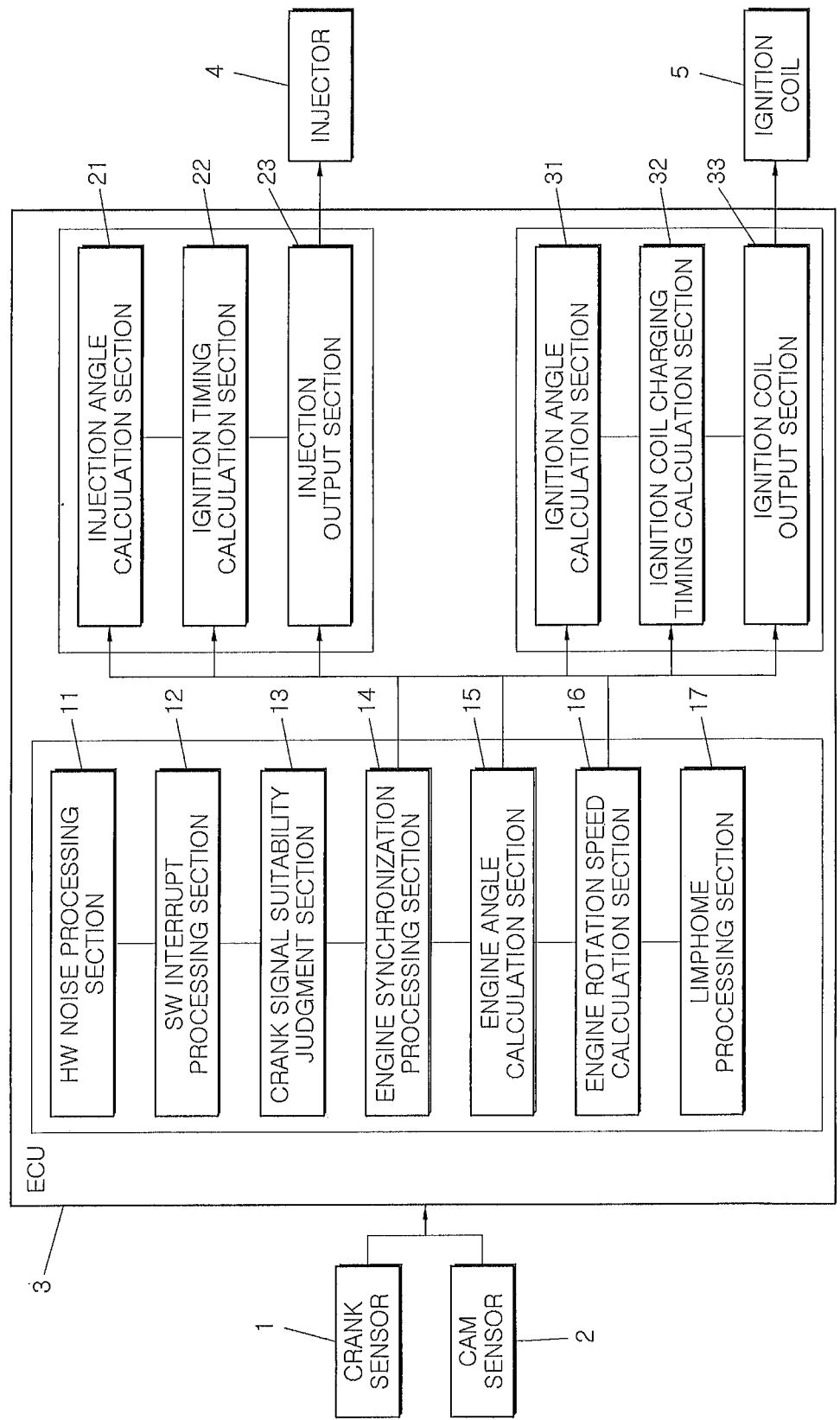
FIG. 1 is a block diagram of an overall system for implementing a method for compensating noise of a crank sensor, according to embodiments of the present invention.
Figure 2:
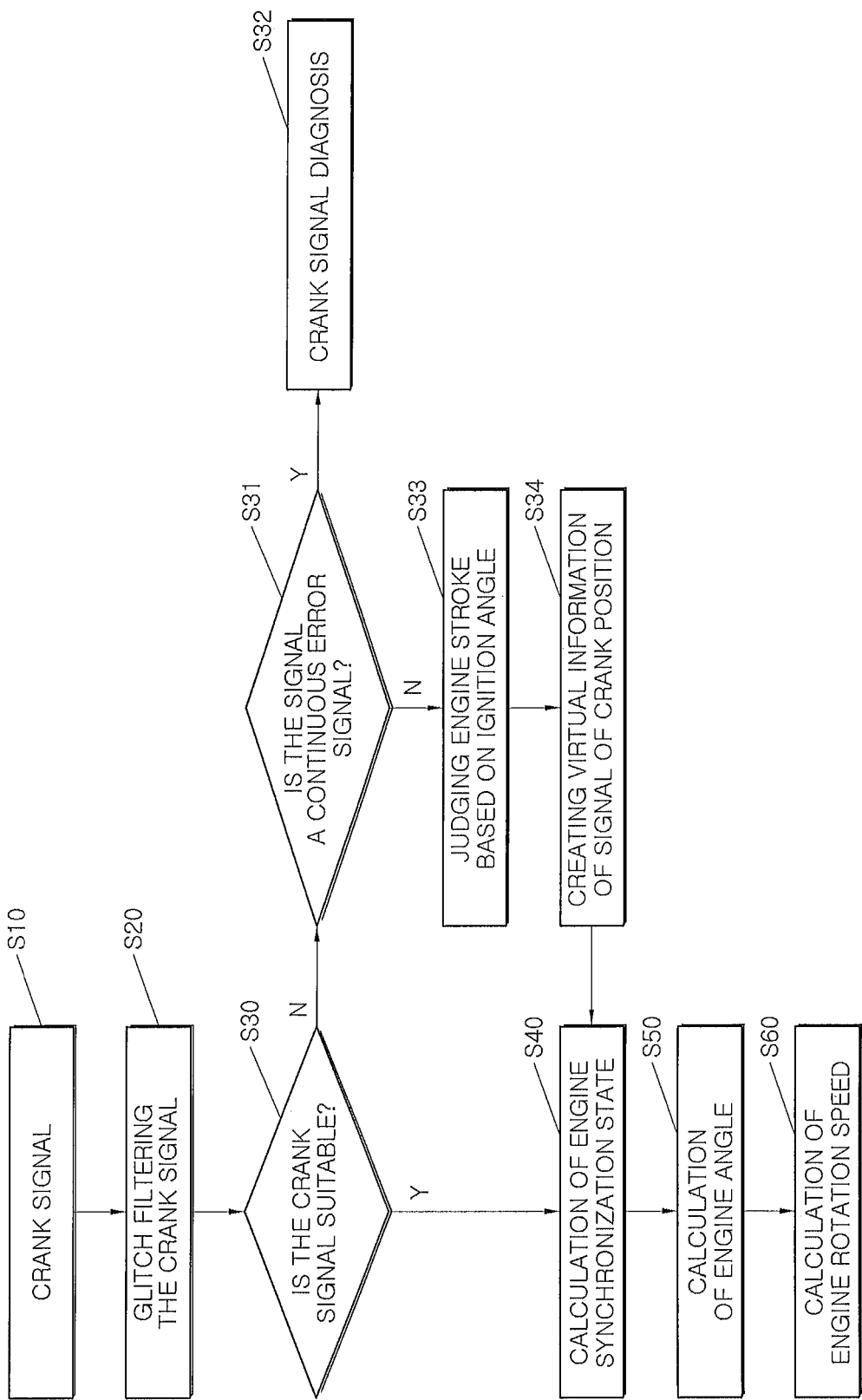
FIG. 2 is a flow chart illustrating a method for compensating noise of a crank sensor, according to embodiments of the present invention.

In embodiments, when only a single crack tooth is identified but not repeated within the a reference time period (discontinuous, occasional error), the at least one controller conducts a compensation process to determine a position (angle) or a rotational speed of a crankshaft using signals from the crankshaft sensor. FIG. 1 shows a block diagram of an overall system for implementing a method for compensating noise of a crank sensor, according to embodiments of the present invention and FIG. 2 shows a flow chart illustrating a method for compensating noise of a crank sensor, according to embodiments of the present invention.

Referring to FIG. 1, an overall system for implementing a method for compensating noise of a crank sensor, according to embodiments of the present invention, comprises a crank sensor 1 and a cam sensor 2, an ECU 3 for receiving signal from the sensors 1 and 2 and calculating information of injection and ignition, an injector 4 to be operated by the ECU 3, an ignition coil 5, and the like.

The ECU 3 receives information of a crank from the crank sensor 1 and information of a cam from the cam sensor 2 and then calculates engine synchronization, engine angle, engine rotation speed, and the like, and outputs control signal to injection and ignition units 4 and 5.

To this end, the ECU 3 comprises a hardware (HW) noise processing section 11 which removes noise from signals input from the sensors 1 and 2 on a hardware basis, a software (SW) interrupt processing section 12 for creating, on a software basis, interrupt on a signal from which noise has been removed, and a crank signal suitability judgment section 13 for judging whether the signal of the crank is suitable to the input signal based on the input interrupt.

Furthermore, the ECU comprises an engine synchronization processing section 14 for calculating information of the engine synchronization, the engine angle and the engine rotation speed respectively when it is judged that there is no problem in the crank signal suitability judgment section 13; an engine angle calculation section 15; an engine rotation speed calculation section 16; an injection angle calculation section 21, an ignition timing calculation section 22 and an injection output section 23, which calculate and output an injection angle and an injection timing respectively based on the calculated engine synchronization, the calculated engine angle and the calculated engine rotation speed; an ignition angle calculation section 31 for calculating and outputting an ignition angle and an ignition coil charging timing; an ignition coil charging timing calculation section 32; and an ignition coil output section 33. Here, the information of the engine rotation speed is used for calculation of the injection timing, while the information of the engine angle is used for calculation of the injection angle. Similarly, the engine rotation speed is used for calculation of the charging timing of the ignition coil, while the information of the engine angle is used for calculation of the ignition angle. The information of the engine synchronization is used directly to determine whether the injector and ignition coil carry out output.

In FIG. 1, reference numeral 17 denotes a Limphome processor for emergency control of a vehicle in the event of failure of a sensor.

The method for compensating noise of a crank sensor according to embodiments of the present invention is to avoid frequent engine synchronization due to noise by delaying the crank signal suitability judgment even when the noise is applied to a crank signal and to compensate calculation of engine angle and engine rotation speed to the extent of normal signal such that no affection to fuel injection and ignition occurs. To this end, the crank signal suitability judgment section 13 of the system is configured as shown in FIG. 2.

Referring to FIG. 2, the method for compensating noise of a crank sensor according to embodiments of the present invention first receives crank signal from the crank sensor 1 in step S10 and removes glitch noise components on a hardware basis in step S20.

Then, it is judged whether the crank signal from which the glitch components have been removed has suitability in step S30. As a result, if the crank signal is judged as a normal signal, the process is proceeded to calculation of engine synchronization state in step S40, calculation of engine angle in step S50, and calculation of engine rotation speed in step S60.

On the other hand, if the signal is judged as an abnormal signal, it is determined whether the system is failed or not based on whether fault of the crank signal is continuous (repetitive for a given time period) or not in step S31. If the system is judged as being failed, crank signal diagnosis is proceeded in step S32.

Here, if it is judged that fault of the crank signal is discontinuous (occasional, not repetitive for a given time period) and therefore the system is not failed but compensation is required, engine stroke is judged based on ignition angle in step S33. Then, based on the determined amount of compensation, virtual information of a crank is created in step S34 and subsequently calculation of engine synchronization state in step S40, calculation of engine angle in step S50 and calculation of engine speed in step S60 are proceeded based on the created virtual information of the crank.

In other words, the method for compensating a crank sensor according to embodiments of the present invention judges engine rotation speed and direction of a piston (i.e., direction to a top dead center (TDC) or a bottom dead center (BDC)) and then judges how much explosion or compression progresses based on the latest ignition angle and in turn determines the amount of compensation.

Specifically, since the period from the moment when explosion occurs to subsequent 90 degrees on the basis of the ignition angle is an acceleration zone and the period from BDC to the next explosion TDC is a deceleration zone, angle before 90 degrees on the basis of the ignition angle is judged as the acceleration zone while angle until 180 degrees after the 90 degrees is judged as the deceleration zone, and the amount of compensation in the acceleration zone and the amount of compensation in the deceleration zone are set differently.

In addition, since acceleration in the acceleration zone becomes faster as it goes from the beginning to the end and deceleration in the deceleration zone becomes slower as it goes from the beginning to the end, the amount of compensation is set based on the ignition angle and the current angle.

Furthermore, the amount of compensation for the deceleration/acceleration zone is intended to vary as the RPM increases. Since the higher the RPM is, the smaller the value of amount of time period between crank teeth (information based on calculation of RPM and angle) is, amount of variation according to compression/explosion stroke is small. In other words, if the RPM is low, the amount of compensation needs to be large, whereas if the RPM is high, the amount of compensation needs to be small.

In addition, since the amount of acceleration/deceleration may be vary depending on an engine in question, a compensation constant which is inherent in the engine is introduced.

The amount of compensation determined by combining the above conditions is as follows:

1) Acceleration Zone (0<(x−y)≤90)

$$t_2 = t_1 \times (1/(x-y)) \times (N_{max}/N_{curr}) \times C_1 \quad \text{(equation 1)}$$

2) Deceleration Zone (90<(x−y)≤180)

$$t_2 = t_1 \times (x-y-90) \times (N_{max}/N_{curr}) \times C_2 \quad \text{(equation 2)}$$

Where $t_2$ is the time period between crank teeth after compensation, $t_1$ is the time period between crank teeth, which is measured at last, x is the current angle, y is the latest ignition angle, $N_{max}$ is the maximum RPM, $N_{curr}$ is the current RPM, $C_1$ is the compensation constant of the engine at the time of acceleration, and $C_2$ is the compensation constant of the engine at the time of deceleration.

In other words, in the method for compensating a crank sensor, the engine stroke is judged based on the ignition angle in step S33 and the virtual information of the crank is created based on the amount of compensation determined by either equation 1 or 2 according to the acceleration zone or the deceleration zone in step S34.

In the method for compensating a crank sensor according to embodiments of the present invention as described above, even if there is no information of a crank due to noise, next crank signal is predicted by using past information of the crank, ignition angle and engine rotation speed, thereby enabling fuel injection and ignition to be performed as accurate as possible.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The embodiments disclosed in the present specification and the accompanying drawings are merely used for the purpose of easily explaining and illustrating the technical idea of the present invention but not limiting the scope of the present invention set forth in the claims. Those skilled in the art will appreciate that various modifications and equivalent other embodiments can be made without departing from the scope of the present invention.

What is claimed is:

1. A method for compensating noise of a crank sensor comprising:
   judging an engine stroke in a direction to a top dead center (TDC) or a bottom dead center (BDC) based on an ignition angle when judgment of fault of crank signal occurs discontinuously,
   determining an amount of compensation to a crank signal of the crank sensor according to an engine rotation speed and the ignition angle in response to an engine stroke, and
   creating virtual information of a crank based on the amount of compensation to the crank signal,
   wherein, based on the ignition angle, an angle before 90 degrees is judged as an acceleration zone while an angle until 180 degrees after 90 degrees is judged as a deceleration zone, and then amount of compensation in the acceleration zone and amount of compensation in the deceleration zone are set differently.

2. The method according to claim 1, wherein the amount of compensation is set so as to vary depending on revolution per minute (RPM).

3. The method according to claim 2, wherein the amount of compensation is set such that it becomes smaller as the RPM becomes higher.

4. The method according to claim 1, wherein the amount of compensation is set by reflecting acceleration and deceleration characteristics depending on an engine.

5. The method according to claim 1, wherein the amount of compensation in the acceleration zone is determined by the following equation:

$$t_2 = t_1 \times (1/(x-y)) \times (N_{max}/N_{curr}) \times C_1,$$

where $t_2$ is the time period between crank teeth after compensation, $t_1$ is the time period between crank teeth, which is measured at last, x is the current angle, y is the latest ignition angle, $N_{max}$ is the maximum RPM, $N_{curr}$ is the current RPM, $C_1$ is the compensation constant of the engine at the time of acceleration, and $C_2$ is the compensation constant of the engine at the time of deceleration.

6. The method according to claim 1, wherein the amount of compensation in the deceleration zone is determined by the following equation:

$$t_2 = t_1 \times (x-y-90) \times (N_{max}/N_{curr}) \times C_2,$$

where $t_2$ is the time period between crank teeth after compensation, $t_1$ is the time period between crank teeth, which is measured at last, x is the current angle, y is the latest ignition angle, $N_{max}$ is the maximum RPM, $N_{curr}$ is the current RPM, $C_1$ is the compensation constant of the engine at the time of acceleration, and $C_2$ is the compensation constant of the engine at the time of deceleration.

7. A method for compensating noise of a crank sensor comprising:

dividing an acceleration zone before 90 degrees and a deceleration zone until 180 degrees after the 90 degrees on the basis of an ignition angle when judgment of fault of a crank signal of the crank sensor occurs discontinuously; and creating virtual information of a crank based on an amount of compensation to the crank signal determined differently according to an engine rotation speed and the ignition angle in response to the acceleration zone or the deceleration zone by the following equations:

1) acceleration zone $(0<(x-y)\leq 90)$ $$t_2=t_1\times(1/(x-y))\times(N_{max}/N_{curr})\times C_1, \text{ or}$$

2) deceleration zone $(90<(x-y)\leq 180)$ $$t_2=t_1\times(x-y-90)\times(N_{max}/N_{curr})\times C_2,$$

where $t_2$ is the time period between crank teeth after compensation, $t_1$ is the time period between crank teeth, which is measured at last, x is the current angle, y is the latest ignition angle, $N_{max}$ is the maximum RPM, $N_{curr}$ is the current RPM, $C_1$ is the compensation constant of the engine at the time of acceleration, and $C_2$ is the compensation constant of the engine at the time of deceleration.

* * * * *